United States Patent
Linåker et al.

(10) Patent No.: US 9,742,973 B2
(45) Date of Patent: Aug. 22, 2017

(54) ARRAY CAMERA DESIGN WITH DEDICATED BAYER CAMERA

(71) Applicant: Sony Corporation, Tokyo (JP)

(72) Inventors: Daniel Linåker, Lund (SE); Johannes Elg, Lund (SE); Jonas Gustavsson, Lung (SE); Mats Wernersson, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 243 days.

(21) Appl. No.: 13/962,204

(22) Filed: Aug. 8, 2013

(65) Prior Publication Data
US 2015/0042831 A1 Feb. 12, 2015

(51) Int. Cl.
*H04N 5/335* (2011.01)
*H04N 9/097* (2006.01)
(Continued)

(52) U.S. Cl.
CPC ....... *H04N 5/2258* (2013.01); *H04N 5/23241* (2013.01); *H04N 5/23245* (2013.01); *H04N 9/045* (2013.01); *H04N 9/09* (2013.01)

(58) Field of Classification Search
CPC ........ H04N 5/2258; H04N 9/09; H04N 9/045; H04N 5/23245; H04N 5/23241
See application file for complete search history.

(56) References Cited

U.S. PATENT DOCUMENTS

2008/0165257 A1* 7/2008 Boettiger .......... H01L 27/14603
348/222.1
2010/0053346 A1* 3/2010 Mitsunaga ................ 348/208.6
(Continued)

FOREIGN PATENT DOCUMENTS

EP 1912434 A1 4/2008

OTHER PUBLICATIONS

International Search Report and Written Opinion; Feb. 13, 2015; issued in International Patent Application No. PCT/IB2014/062810.
(Continued)

*Primary Examiner* — Twyler Haskins
*Assistant Examiner* — Carramah J Quiett
(74) *Attorney, Agent, or Firm* — James C. Edwards; Moore & Van Allen, PLLC

(57) ABSTRACT

The invention is directed to systems, methods and computer program products for capturing an image using an array camera. A method comprises determining an application associated with capturing an image using an array camera, wherein the array camera comprises a first sensor and at least one second sensor, wherein the first sensor comprises a red filter, a green filter, and a blue filter, and wherein each second sensor comprises a red filter, a green filter, or a blue filter; determining whether the application requires the image to have a first resolution equal to or greater than a predetermined resolution; determining whether the application requires depth information associated with the image; and in response to determining the application does not require the image to have the first resolution and does not require depth information, activating the first sensor, and capturing the image using the first sensor.

13 Claims, 2 Drawing Sheets

(51) Int. Cl.
*H04N 5/225* (2006.01)
*H04N 9/09* (2006.01)
*H04N 5/232* (2006.01)
*H04N 9/04* (2006.01)

(56) References Cited

U.S. PATENT DOCUMENTS

2011/0279721 A1  11/2011  McMahon
2012/0188422 A1   7/2012  Cho
2015/0029358 A1*  1/2015  Kaizu .................. 348/223.1

OTHER PUBLICATIONS

International Preliminary Report on Patentability; dated Feb. 18, 2016; issued in International Patent Application No. PCT/IB2014/062810.

Japanese Patent Office; Notice of Rejection; dated Feb. 7, 2017; issued in Japanese Patent Application No. 2016-530634.

* cited by examiner

ARRAY CAMERA DESIGN WITH DEDICATED BAYER CAMERA

BACKGROUND

There is a need to reduce the computational load and power consumption of an array camera based on the application for which the array camera is being used.

BRIEF SUMMARY

Embodiments of the invention are directed to systems, methods and computer program products for capturing an image using an array camera. An exemplary method comprises: determining a type of application associated with capturing an image using an array camera, wherein the array camera comprises a first sensor and at least one second sensor, wherein the first sensor comprises a red filter, a green filter, and a blue filter, and wherein each second sensor comprises a red filter, a green filter, or a blue filter; determining whether the application requires the image to have a first resolution equal to or greater than a predetermined resolution; determining whether the application requires depth information associated with the image; and in response to determining the application does not require the image to have the first resolution and determining the application does not require depth information, activating the first sensor, and capturing the image using the first sensor.

In some embodiments, the method further comprises in response to determining the application does not require the image to have the first resolution and determining the application does not require depth information, deactivating the at least one second sensor.

In some embodiments, deactivating the at least one second sensor comprises deactivating at least one power source associated with the at least one second sensor.

In some embodiments, the method further comprises in response to determining the application requires the image to have the first resolution and determining the application requires depth information, activating the at least one second sensor, and capturing the image using the at least one second sensor.

In some embodiments, the method further comprises in response to determining the application requires the image to have the first resolution and determining the application requires depth information, deactivating the first sensor.

In some embodiments, the array camera comprises a plurality of cameras positioned in a grid.

In some embodiments, the first camera is positioned substantially near the center of the grid.

In some embodiments, the first camera is positioned near an edge of the grid.

In some embodiments, the red filter, the green filter, and the blue filter comprise a Bayer filter.

In some embodiments, the red filter, the green filter, and the blue filter are arranged in a second grid.

In some embodiments, the type of application is determined by a user of the array camera.

In some embodiments, the method further comprises activating the first sensor comprises activating a power source associated with the first sensor.

In some embodiments, an apparatus is provided for capturing an image. The apparatus comprises an array camera comprising a grid of sensors comprising: a first sensor, wherein the first sensor comprises a red filter, a green filter, and a blue filter; and at least one second sensor, and wherein each second sensor comprises a red filter, a green filter, or a blue filter.

In some embodiments, the apparatus further comprises a memory; a processor; and a module stored in the memory, executable by the processor, and configured to: determine a type of application associated with capturing an image using the array camera; determine whether the application requires the image to have a first resolution equal to or greater than a predetermined resolution; determine whether the application requires depth information associated with the image; and in response to determining the application does not require the image to have the first resolution and determining the application does not require depth information, activate the first sensor, and capture the image using the first sensor.

In some embodiments, a computer program product is provided for capturing an image using an array camera. The computer program product comprises a non-transitory computer-readable medium comprising a set of codes for causing a computer to: determine a type of application associated with capturing an image using an array camera, wherein the array camera comprises a first sensor and at least one second sensor, wherein the first sensor comprises a red filter, a green filter, and a blue filter, and wherein each second sensor comprises a red filter, a green filter, or a blue filter; determine whether the application requires the image to have a first resolution equal to or greater than a predetermined resolution; determine whether the application requires depth information associated with the image; and in response to determining the application does not require the image to have the first resolution and determining the application does not require depth information, activate the first sensor, and capture the image using the first sensor.

BRIEF DESCRIPTION OF THE DRAWINGS

Figure 1:
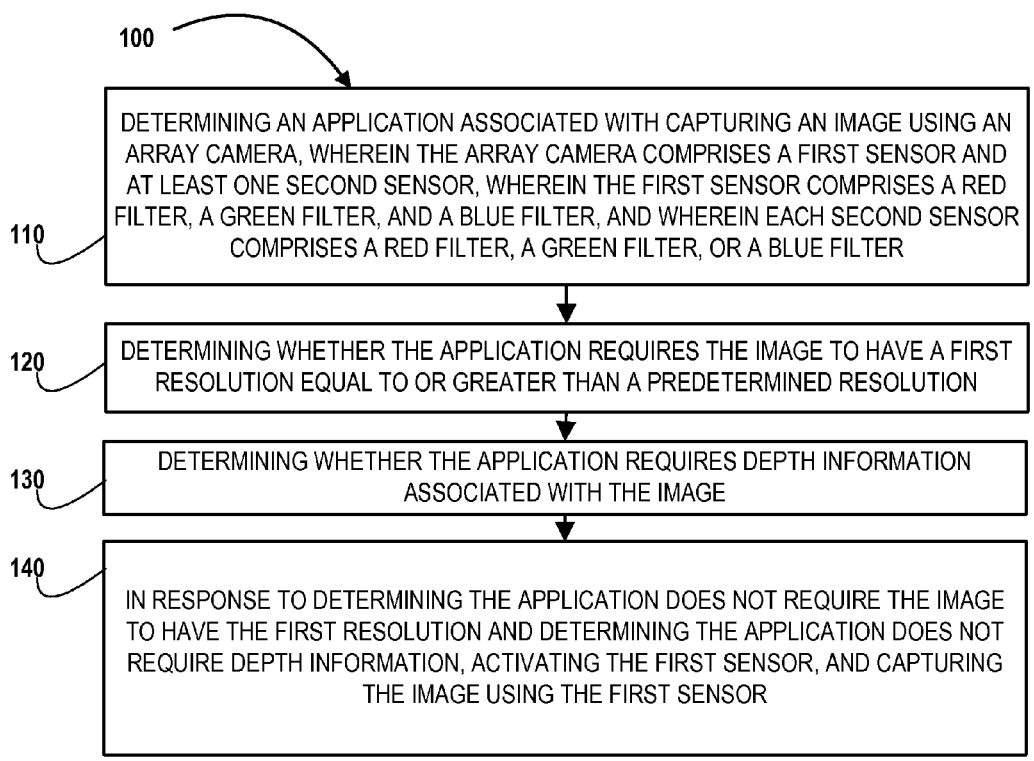
Figure 2:
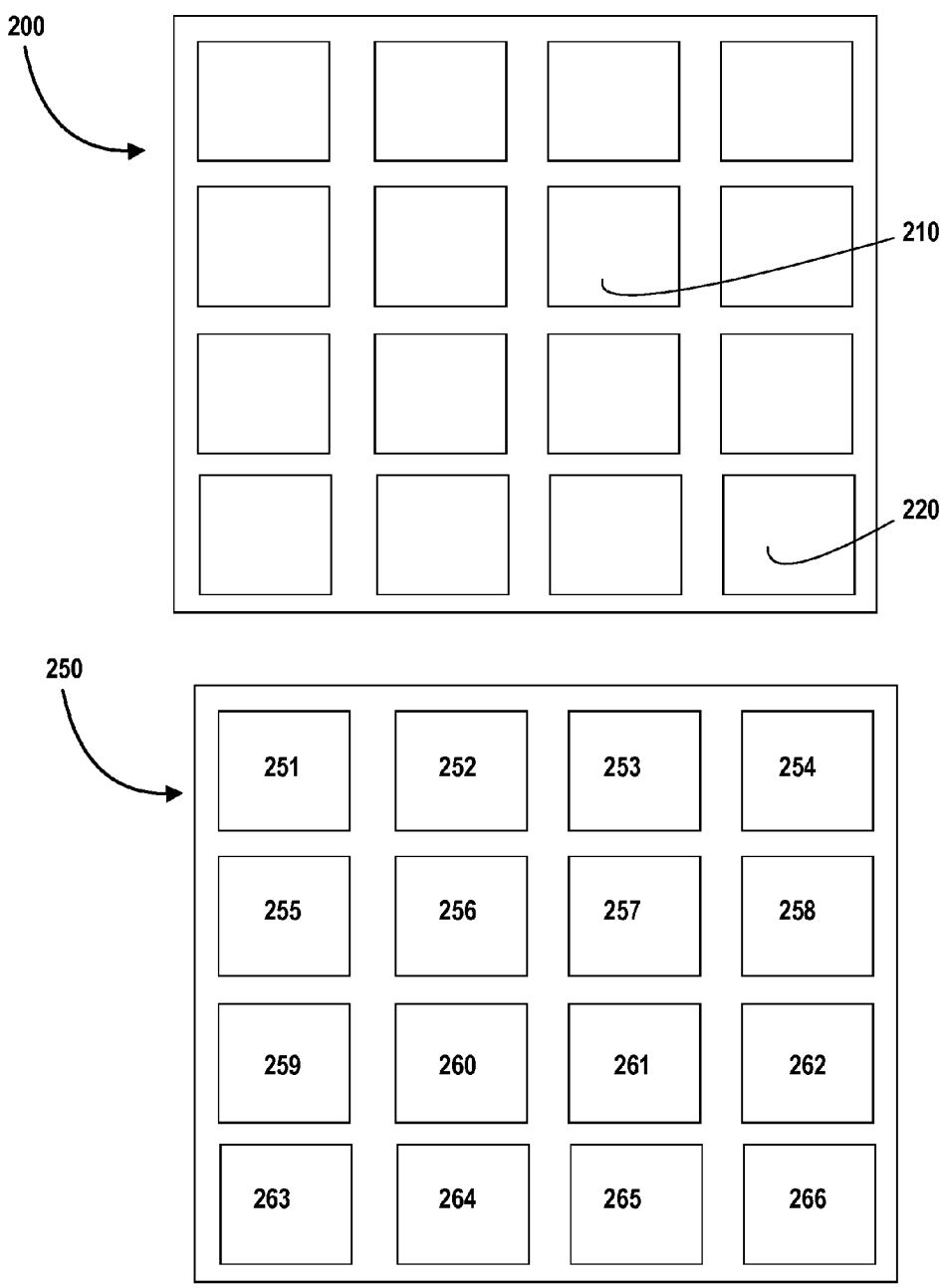

Having thus described embodiments of the invention in general terms, reference will now be made to the accompanying drawings, where:

FIG. 1 is an exemplary process flow for capturing an image using an array camera, in accordance with embodiments of the present invention;

FIG. 2 presents an exemplary grid of cameras in an array camera and an exemplary Bayer filter, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for using a dedicated Bayer camera (e.g., a single dedicated Bayer camera) in an array camera to reduce computational load for applications where high resolution capability (e.g., a resolution equal to or greater than a predetermined resolution) or depth information is not needed in the process of capturing or generating an image.

A typical array camera comprises several low resolution cameras (or sensors) that are arranged in a grid (e.g., a quadrilateral grid). As used herein, a low resolution camera is a camera that captures an image with a resolution less than a predetermined resolution. Each camera in the grid of cameras may substantially simultaneously capture an image from a different angle. In alternate embodiments, each camera may capture an image at a different time. Additionally, each camera captures an image using a single-colored filter (e.g., a red, green, or blue filter). When the images captured by each camera are edited together using functionality to determine depth information (parallax calculations) associated with the images and functionality to increase the resolution of the final image by interpolating the individual red, green, and blue images, a high resolution RGB (red green blue) image is obtained. These functions may be performed either after or substantially simultaneously with capturing an image using the array camera. These functions may be performed by the array camera or other computing devices in communication with the array camera. The computational load and power consumption for performing the functions of determining depth information associated with an image and increasing the resolution of the image is high (e.g., equal to or greater than a predetermined computational load level and/or power consumption level).

The functions of determining depth information associated with objects in an image and increasing the resolution of the image may not be required for some applications (e.g., image previewing applications, video recording applications, etc.). Therefore, there is a need for an array camera that enables these functions to be activated selectively based on the type of application for which the array camera is being used.

Referring now to FIG. 1, FIG. 1 presents a process flow 100 for capturing an image using an array camera. The various process blocks presented in FIG. 1 may be executed in an order that is different from that presented in FIG. 1. At block 110, the process flow comprises determining an application associated with capturing an image using an array camera, wherein the array camera comprises a first sensor and at least one second sensor, wherein the first sensor comprises a red filter, a green filter, and a blue filter, and wherein each second sensor comprises a red filter, a green filter, or a blue filter). At block 120, the process flow comprises determining whether the application requires the image to have a first resolution equal to or greater than a predetermined resolution (i.e., a high resolution). At block 130, the process flow comprises determining whether the application requires depth information associated with the image. At block 140, the process flow comprises in response to determining the application does not require the image to have the first resolution and determining the application does not require depth information, activating the first sensor, and capturing the image using the first sensor. As used herein, a sensor may refer to a camera.

According to embodiments of the present invention, an array camera may comprise a grid of cameras 200 as presented in FIG. 2. A camera from the grid of cameras 200 may capture images using an RGB Bayer color filter rather than individual red, green, or blue filters. This camera may be referred to as a first camera or a Bayer camera. While the array camera, in some embodiments, includes a first camera, in other embodiments, the array camera includes more than one first camera. The first camera could be a camera closer to the center of the grid (e.g., camera 210) or closer to the edge of the grid (e.g., camera 220). The remaining cameras in the grid of cameras 200 include filters associated with a single color (e.g., red, green, or blue). These remaining cameras may be referred to as second cameras.

The first camera is enabled for the purpose of video recording and camera previewing. The first camera consumes less power (e.g., generates less heat) compared to the second cameras, either singly or in combination, when the array camera is used for lengthy video recording (e.g., video recording for at least a predetermined duration) and camera previewing. Thus, the array camera is able to record video with an acceptable frame rate (e.g., a frame rate equal to or greater than a predetermined frame rate).

As used herein, video recording refers to the process of recording video using the array camera. As used herein, camera previewing refers to the process of enabling a user to preview images (e.g., still images) before the images are captured by the array camera.

FIG. 2 also presents an exemplary Bayer filter 250 that is used for the first camera. Filters 251, 253, 259, and 261 are blue filters. Filters 252, 254, 255, 257, 260, 262, 263, and 265 are green filters. Filters 256, 258, 264, and 266 are red filters. When a camera captures an image using a single-colored filter, the captured image will have the same color as the filter. When a camera captures an image using a Bayer filter, the captured image will be multi-colored.

For applications where a high resolution final image is necessary (e.g., for high resolution still images) or where depth information associated with objects in the final image is necessary, the second cameras are activated and used to capture individual images. These individual images may be processed (e.g., using one or more signal processing functions) to produce a final image. For such applications, the first camera may be deactivated and not used to capture an image. However, in alternate embodiments, the first camera, in addition to the second cameras, may also be activated and used to capture an image.

For applications where a high resolution final image is not necessary (e.g., for image previewing or video recording) and where depth information associated with objects in the image is not necessary, the first camera is activated and used to capture an image. This captured image may be processed (e.g., using one or more signal processing functions) to produce a final image. For such embodiments, the second cameras are deactivated and are not used to capture images. The power and computing load for generating a final image for applications where a high resolution final image and/or depth information is not required is less than the power and computing load for generating a final image for applications where a high resolution final image and/or depth information is required.

In some embodiments, prior to capturing an image, the array camera determines the type of application for which the image is to be captured. The array camera than activates the first camera and/or the second cameras based on the type of application. In embodiments where the array camera cannot determine the type of application for which the image is to be captured, the array camera prompts the user to specify the type of application for which the image is to be captured (e.g., via a display that is in communication with the array camera). In some embodiments, the user can activate or deactivate the first camera and/or the second cameras.

In some alternate embodiments, the first camera may also function as one of the second cameras, i.e., the first camera may capture an image using a red, green, or blue filter rather than a Bayer filter. In some other alternate embodiments, each of the second cameras may function as a first camera, i.e., each second camera may capture an image using a Bayer filter rather than individual red, green, or blue filters. Therefore, in such embodiments, each camera in the array camera may include a swappable filter, where a Bayer filter can be replaced with a single colored filter, or vice versa, based on the type of application for which an image is to be captured. Therefore, once the array camera determines the type of application for which the image is to be captured, the array camera determines the current filter for each camera in the grid of cameras, determines the type of filter for each camera required for the application, and then determines whether to swap the current filter for each camera.

In some embodiments, the array camera may be an independent device that includes a memory and a computing device processor to execute the various processes, functions, or applications described herein. The memory may be used to store the various predetermined values described herein. In other embodiments, the array camera may be part of a computing device (e.g., a mobile phone, a tablet computing device, a laptop computer, a watch, or the like). As used herein, a sensor may also be referred to as a camera or image-capturing device.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for capturing an image using an array camera, the method comprising:
   providing the array camera comprising:
      a processor, and
      a grid of sensors comprising:
         a single first sensor in operable communication with the processor and comprising a Bayer filter including at least one red filter, at least one green filter and at least blue filter, and
         a plurality of second sensors in operable communication with the processor, each second sensor comprising one of a red filter, a green filter or a blue filter;
   prior to capturing the image, determining, by the processor, whether an application associated with capturing an image requires (1) the image to have a first resolution equal to or greater than a predetermined resolution, and (2) depth information associated with the image; and
   in response to determining the application does not require at least one of (1) the image to have the first resolution, and (2) depth information, activating the single first sensor, deactivating the plurality of second sensors and capturing the image using the single first sensor including the Bayer filter.

2. The method of claim 1, wherein the application comprises a video recording application.

3. The method of claim 1, wherein the application comprises a camera preview application.

4. The method of claim 1, wherein deactivating the plurality of second sensors comprises deactivating at least one power source associated with the plurality of second sensors.

5. The method of claim 1 further comprising:
   in response to determining the application requires (1) the image to have the first resolution and (2) depth information, activating the plurality of second sensors, and capturing the image using the plurality of second sensors.

6. The method of claim 5, further comprising:
   in response to determining the application requires (1) the image to have the first resolution and (2) depth information, deactivating the first sensor.

7. The method of claim 1, wherein the first sensor is positioned substantially near the center of the grid.

8. The method of claim 1, wherein the first sensor is positioned near an edge of the grid.

9. The method of claim 1, wherein the at least one red filter, the at least one green filter, and the at least one blue filter of the first sensor are arranged in a second grid.

10. The method of claim 1, wherein the application is determined by a user of the array camera.

11. The method of claim 1, wherein activating the first sensor comprises activating a power source associated with the first sensor.

12. An apparatus for capturing an image, the apparatus comprising:
   a memory;
   a processor in operable with the memory;
   an array camera in operable communication with the processor and comprising a grid of sensors comprising:
      a single first sensor, wherein the first sensor comprises a Bayer filter comprising at least one red filter, at least one green filter, and at least one blue filter, and
      a plurality of second sensors, wherein each second sensor comprises one of a red filter, a green filter, or a blue filter; and
   a module stored in the memory, executable by the processor, and configured to:
      prior to capturing the image, determine whether an application associated with capturing the image requires (1) the image to have a first resolution equal to or greater than a predetermined resolution, and (2) depth information associated with the image, and
      in response to determining the application does not require at least one of (1) the image to have the first resolution, and (2) depth information, activate the single first sensor, deactivate the plurality of second sensors, and capture the image using the single first sensor including the Bayer filter.

13. A computer program product for capturing an image using an array camera, the computer program product comprising:
   a non-transitory computer-readable medium comprising a set of codes for causing a computer to:
   prior to capturing an image, determine whether an application associated with capturing an image requires (1) the image to have a first resolution equal to or greater than a predetermined resolution, and (2) depth information associated with the image; and
   in response to determining the application does not require at least one of (1) the image to have the first resolution, and (2) depth information, activate a single first sensor in the array camera, deactivate a plurality of second sensors in the array camera and capture the image using the single first sensor including a Bayer filter,
   wherein the single first sensor and the plurality of second sensors are positioned in a grid and the single first sensor comprises the Bayer filter comprising at least one red filter, at least one green filter and at least blue filter, and the plurality of second sensors each comprise one of a red filter, a green filter or a blue filter.

* * * * *